UNITED STATES PATENT OFFICE.

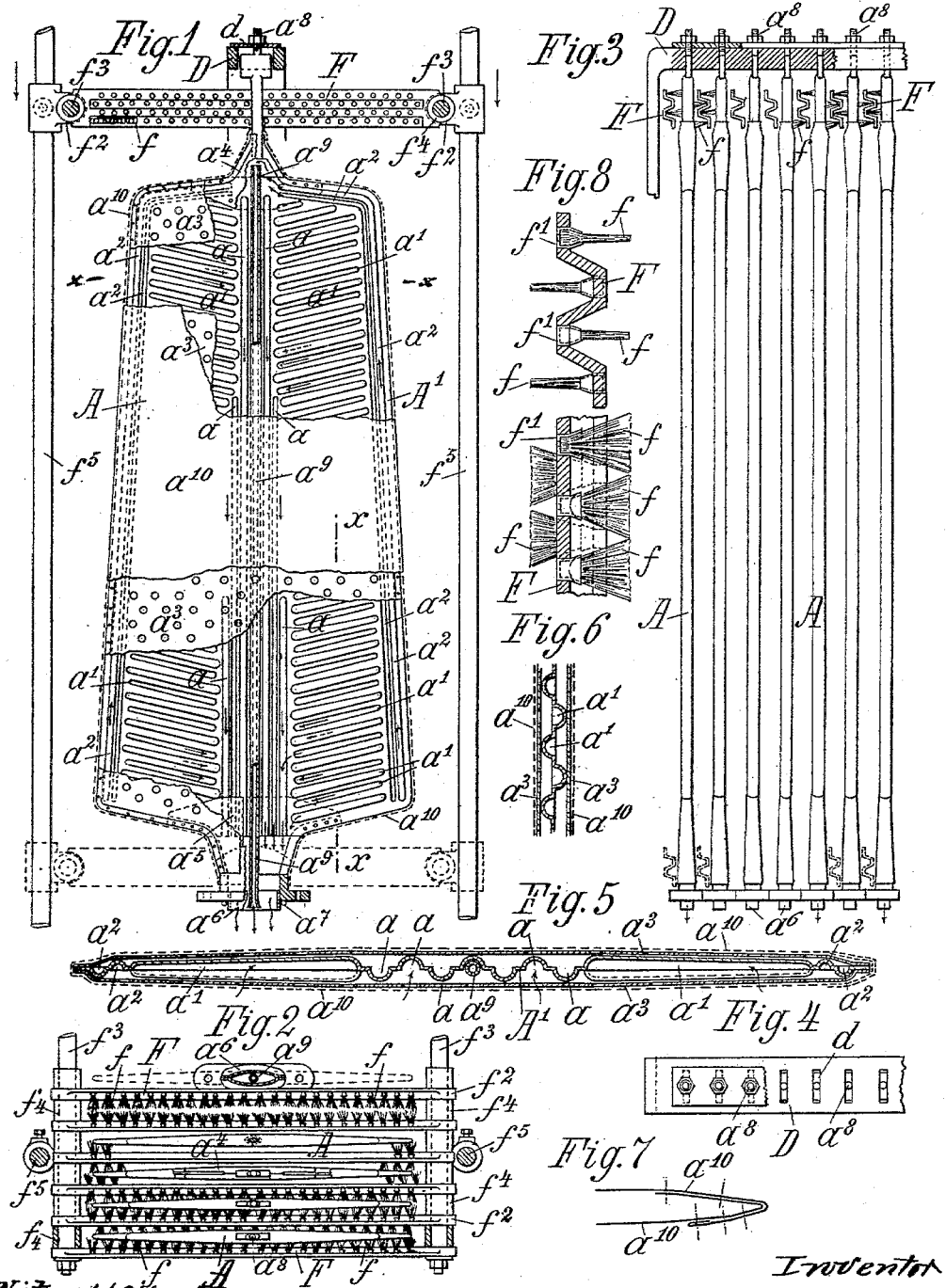

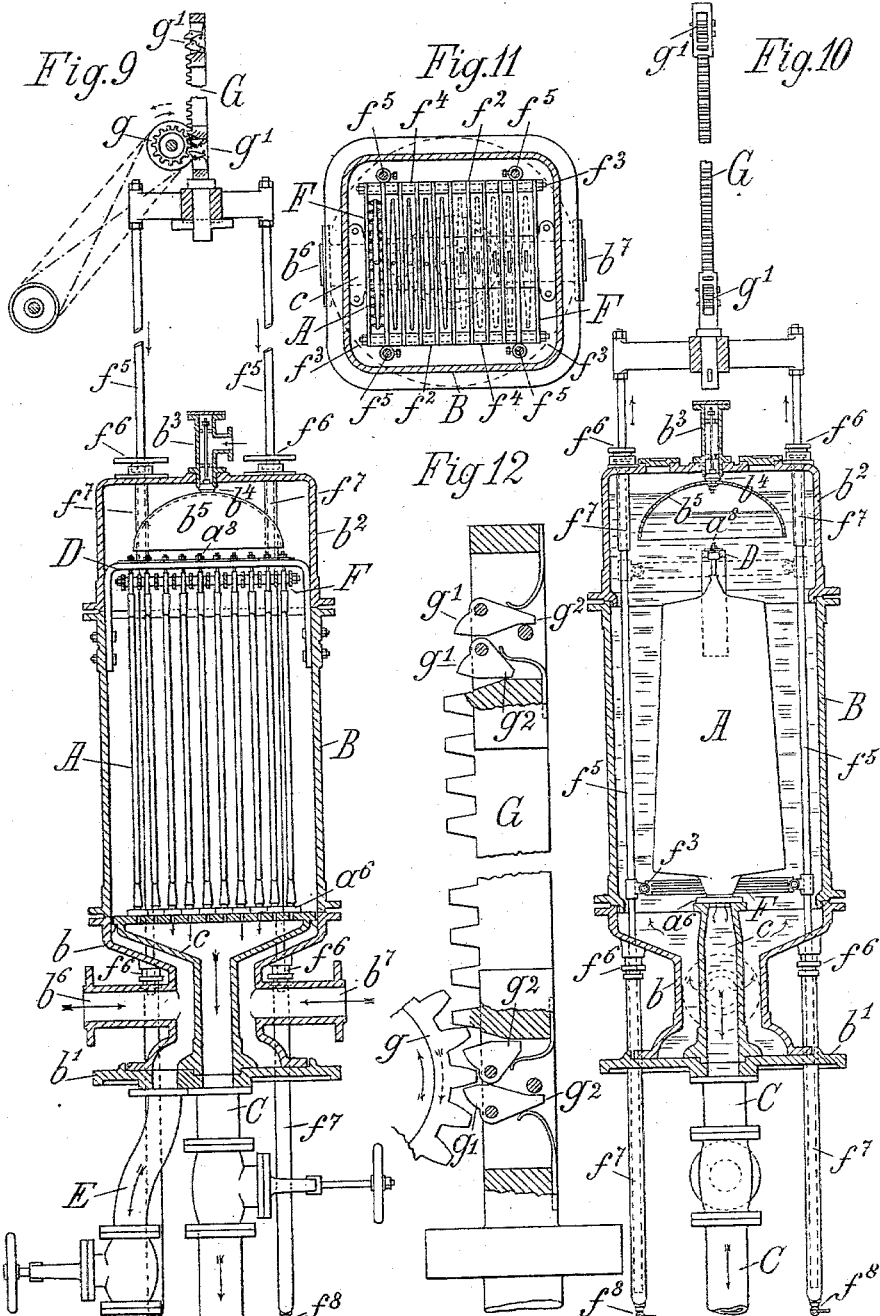

FRIEDRICH BREYER, OF VIENNA, AUSTRIA-HUNGARY.

ASBESTOS FILTER.

SPECIFICATION forming part of Letters Patent No. 571,744, dated November 24, 1896.

Application filed April 23, 1895. Serial No. 546,889. (No model.)

*To all whom it may concern:*

Be it known that I, FRIEDRICH BREYER, a subject of the Emperor of Austria-Hungary, residing at Vienna, in the Province of Lower Austria, in the Empire of Austria-Hungary, have invented certain new and useful Improvements in Asbestos Filters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in that class of asbestos filters in which a layer of asbestos is formed on the outer surface of the porous walls of flat hollow bodies, of which a greater or less number are included in the filter-casing, the interior of which is in communication with a supply-pipe for the water to be filtered.

The present improvements, when used in their entirety, enable a filtering-plant to be arranged for delivering any quantity of not only sterilized water, but also of water that is not deprived of its gaseous constituents, such as carbonic acid, which is essential for its palatable properties. These objects necessitate a special construction of filtering bodies and a new production of the filtering material and its introduction into the filter-bodies, and lastly a cleansing device, which is in continuous connection with the filter, so as to be put into action at will for freeing the filter-layers of deposit. For these purposes the hollow bodies carrying the asbestos layers are so arranged that the filtered liquid and the gases are led off from one or more of them through a common discharge-pipe.

The application of the asbestos layers to the hollow bodies is effected before they are introduced into the filter-casing, for which purpose all the pores of the envelop of the hollow body are in the first instance filled in with a cement composed of asbestos and water-glass, which, being rendered water-resisting, constitutes a washable filtering-layer of asbestos conglomerate, which, after introduction of the filter-body into the casing, is rendered perfectly impervious to micro organisms by means of a mixture of asbestos and aluminium contained in the sterilizing liquid, which is then forced through.

In order to regenerate the filter-layers which have become clogged through long usage, they are scrubbed by means of a peculiar brushing apparatus, and upon the thus cleared asbestos conglomerate a fresh layer of micro-filtering medium is deposited by means of the sterilizing liquid, as above described.

I will proceed to describe my invention, more particularly with reference to the accompanying drawings, in which—

Figure 1 shows an elevation of a hollow body constituting a filtering element, the covering-layers of which are partly removed, in combination with the brushing apparatus. Fig. 2 is a plan of several such hollow bodies with their intermediate brushes, some of the bodies being shown in horizontal section, taken at different levels. Fig. 3 shows a side view of several hollow bodies combined with each other and a cross-section through the brushes. Fig. 4 is a plan of part of Fig. 3; Fig. 5, an enlarged horizontal section through one of the filter-bodies; Fig. 6, a vertical section through part of the same on line $x\ x$, Fig. 1. Fig. 7 is a detail section of the joint of the fiber covering the filtering-body at Fig. 5. Fig. 8 shows an enlarged detail of one of the brushes in vertical and horizontal section. Figs. 9 and 10 are two sections at right angles to each other through the filtering apparatus, which consists of a certain number of the filter elements inclosed in a casing and provided with the mechanically-actuated brushing apparatus. Fig. 11 is a horizontal section of the filter apparatus. Fig. 12 shows to a larger scale an automatic disengaging device for limiting the motion of the brushes.

As shown in Fig. 1, each filter element A consists of a stamped metal plate A' as middle piece, having in the middle several vertical hollow ribs $a$ of varying length, and on either side of these inclined ribs $a'$, rising toward the outer end, and also ribs $a^2$, running parallel to the two longitudinal edges, which ribs $a^2$ run together at the upper narrow end of the middle piece. The ribs $a\ a'\ a^2$ serve both for stiffening the middle piece and for producing a uniform circulation of the water and gases being filtered. This middle piece A' is covered on both sides with perforated sheet metal $a^3$, which is riveted together at the edges and is united at intervals to the inclined and vertical ribs by means of solder introduced through some of the perforations. The supporting-body thus formed is of a double-convex-lens shape in cross-section. At the upper and lower ends it is riveted to a head and foot piece $a^4$ and $a^5$, formed of two suitably-shaped pieces of sheet metal, $a^5$ being soldered into an oval mouthpiece $a^6$, from which it projects somewhat, in order to enable a packing $a^7$, Fig. 1, to be laid around it, which serves to fit the filter element water-tight to the element base to be presently described. The head-piece $a^4$ is closed at top and carries a casting terminating in a screw-bolt $a^8$. The support thus formed has a tube $a^9$ open at both ends passing right through its middle and entering the hollow of the head $a^4$ at the upper end and the mouthpiece $a^6$ at the lower end, which tube serves for leading off the gases that have penetrated into the interior of the filter element.

Over the supporting-body formed by the ribbed plate $A'$ and the perforated sheets $a^3$ are laid two pieces of textile fabric $a^{10}$, having the same form as the body, and the edges of which are attached together by sewing at the longitudinal edges, as shown at Fig. 7, and after drawing the same over the body they are also sewed together at the lower narrow side. In consequence of the double-convex-lens-shaped section of the element-support and the form of the textile covering a uniform tension can be imparted to the latter, whereby it is possible to impart to the asbestos filtering-layer to be applied thereto the necessary rigidity and solidity.

The water forced from the outside into the filter element by pressure circulates underneath the textile covering in such manner that it flows through the inclined ribs $a'$ to the vertical middle ribs $a$ and flows through these to the mouthpiece, where it is discharged. The carbonic acid that has entered rises up in the edge ribs $a^2$ and is drawn into the middle tube $a^9$ by the sucking action of the discharged filtered water in order to be drawn off together with such water from the filter element.

The formation of the asbestos filtering-layers upon the textile covering is effected before the element is introduced into the casing, this being permissible on account of the rigidity of the element and of the textile covering, which not only allows of a perfect saturation and filling in thereof with asbestos fibers, but also insures a permanent cementing together of the latter, the formation of the layer being effected as follows: Serpentine asbestos mechanically ground very fine is stirred up with water to a paste and is then rubbed into the textile covering by brushes, the excess of asbestos fibers being brushed off while wet, after which the element is allowed to dry. After repeating the above operation several times a water-glass solution is drawn through the filter element by suction and is rubbed in with the asbestos fibers on the surface by means of brushes. By this means a mortar is formed, having an accurately-determinable consistency and cementing power which fills in all interstices in the textile fabric. The fixing of this mortar, so as to be permanent against the action of water, can be effected either by slowly drying the filter element or by introducing the dried element into a bath of chlorid of calcium and after drying immersing it in a bath of pure water and then again drying. The filter-surface thus produced, silicated like hydraulic cement, already filters water containing finely-divided alumina in suspension in a crystal clear condition, and it can be cleansed with brushes when choked with deposit without in any way impairing its power of retaining micro-organisms from the filtrate.

In the above-described manner washable filter elements are produced having a coating of asbestos conglomerate that is impervious to micro-organisms.

In order to obtain a filtrate free from germs, the filter elements, after introduction into the casing, are sterilized by forcing boiling water through the same, to which small quantities of a filter compound (from twelve to fifteen grams to one cubic meter of water) are added, which renders the filter-layer impervious to micro-organisms. This filter compound consists of asbestos fibers mixed with alumina, (kaolin,) of which the former are preferably first ground dry, together with an equal quantity of common salt or other suitable crystalline salt soluble in water for effecting a very fine subdivision of the asbestos. The ground mass is moistened, then highly dried, and again ground, and this process is repeated until the desired degree of subdivision of the asbestos has been obtained. The object of adding salt is that in consequence of the moistening this is dissolved, and the flakes or small balls of asbestos are saturated with concentrated salt lye, which crystallizes again within the balls on drying, so that in the following grinding process the asbestos fibers are effectually separated from each other again by the action of the salt. The addition of alumina can be effected simultaneously with the salt, so as to accelerate the process. This exceedingly finely-subdivided filter material can be kept for a very long time in an air-dried condition without deteriorating.

The filter-casing B, into which the filter elements A, provided with a washable but not yet sterilized filter-layer, are introduced, is a vessel the lower part $b$ of which contains the element base $c$, common to all the elements and communicating with the filtrate discharge-pipe C, the said base, as also the part $b$ of the casing, being fixed water-tight upon the base-plate $b$. The mouthpieces $a^6$ of the elements are screwed onto the base. The bolts $a^8$, at the upper end of the filter element A, pass through slots $d$ of a bridge-piece D, fixed to the inner surface of the casing B, and serving to hold the elements in their proper relative position. By screwing up the nuts of the bolts $a^8$ the elements can be stretched tight in the longitudinal direction in order to prevent them from buckling when being brushed, Figs. 3, 4, and 9.

The top of the filter-casing is closed by a hood $b^2$ with air-pipe $b^3$, which is closed by a float-valve $b^4$ with bell $b^5$, as soon as the latter is closed by the rising of the water to be filtered introduced into the casing. The concussions resulting from the forcing in of the water are deadened by the air-cushion within the bell.

The bottom $b$ of the casing is provided with branch pipes $b^6$ $b^7$, which communicate, respectively, with the unfiltered-water supply and the hot-water supply. It is also connected to the sludge-discharge pipe E, Fig. 9.

For effecting a rapid and perfect cleansing of the filter elements when choked with deposit, which, in conjunction with special construction of the elements and the formation of the filter-layer, constitutes an essential condition for the fulfilment of the first above-named object, a mechanical brushing apparatus is employed, consisting of brushes that can be moved up and down between the filter elements. Each of these brushes consists of a brush-plate F, which is made of a corrugated section, as shown at Figs. 3 and 8, in order to render the bristle-tufts sufficiently elastic and yet not occupying too much room. The bristle-tufts $f$ are inserted in the holes of the ridges projecting alternately on opposite sides in such manner that each brush can operate on two opposite sides. The several tufts are drawn into stamped sockets $f'$ and are fixed therein by pressing the edge of the socket flat, whereupon the sockets are driven with considerable pressure into the holes of the brush-plate. The tufts, which are arranged with their flat sides in the longitudinal direction of the plate, must be made of such a length as to fit accurately against the lens-shaped cross-section of the filter element, for which purpose a rod-hot piece of iron having a surface shaped to correspond with the element is, in the first instance, drawn through between each two brushes in a direction parallel with the vertical width of the brush-plate.

In order that in singeing the brush-tufts these may not be shortened too much and thus lose their efficacy, the two opposite brushes are held during the singeing at a distance apart somewhat greater than that which they occupy in the filter apparatus.

The brush-plates are provided at their two ends with eyes $f^2$ and are threaded on transverse rods $f^3$, on which they are held at the proper distance apart corresponding to the filter elements by means of ferrules $f^4$, threaded on between them, Figs. 2 and 11.

The entire brush device is fixed to the vertical guide-rods $f^5$, which pass through stuffing-boxes $f^6$ of the bottom $b$ and hood $b^2$ of the filter-casing, which stuffing-boxes, for insuring a close joint, have tubes $f^7$, Fig. 10, attached to them, the lower ends of which extend beyond the casing B and are provided with drain-cocks $f^8$.

The up-and-down motion of the guide-rods, together with the brushes, is effected by an open and a crossed belt on fast and loose pulleys, which turn the pinion $g$, Fig. 9, that gears with the rack G, attached to the brush apparatus alternately in opposite directions, according as the one or the other belt is put in gear.

For automatically interrupting the motion of the toothed rack as soon as the brushes have arrived at their highest or lowest position a stopping-gear is provided, which consists of pivoted tappets $g'$, Fig. 12, provided at both ends of the toothed rack G, which, when acted upon in the one direction, can turn out of the way of the teeth of the pinion $g$, so that this slides over them and does not impart its motion to the rack, while when acted upon in the contrary direction they are held by stops $g^2$ in such positions that the pinion $g$ in its reversed motion will gear therewith, and thus impart its motion to the rack.

The working of this filter apparatus is so arranged that the sludge-pipe E and branch pipe $b^7$ for the water to be filtered being closed boiling water under a pressure about 0.7 atmospheres and having the above-described antimicro-filtering material mixed with it is supplied to the filter-casing B, so that during the sterilizing the filter-layers are at the same time rendered impervious to micro-organisms. The discharge of the warm filtrate is effected through a branch on the pipe C. (Not shown on the drawings.) The branch $b^6$ being then opened cold unfiltered water is introduced into the casing, while the hot-water supply is closed. As soon as the casing B is sufficiently cooled the collecting-pipe C for the filtered water is opened, so as to allow the filtered water freed from germs, together with the gases, to be led away to wherever required.

If after lengthened use the filter becomes clogged with sludge, so as not to deliver sufficient water, the discharge-pipe for filtered water is closed, the brush apparatus is put in action, the casing being full of water, and the sludge removed from the filter elements is discharged through the sludge-pipe E. The casing is then flushed with unfiltered water, and the sterilizing process with supply of materials for rendering the filter impervious to micro-organisms is repeated.

The above-described filter apparatus can be employed either singly or any number thereof may be combined as one apparatus, all being connected to a common discharge-pipe.

I claim—

1. The mode of preparing filtering media, which consists in filling the meshes or interstices of a textile fabric with finely-divided asbestos, treating the fabric so prepared with a solution of water-glass whereby a cementing-mortar is formed, distributing the same uniformly throughout the meshes or interstices of the fabric, fixing the mortar by treatment with calcium chlorid, and rendering the same germ-proof by treatment with boiling water holding finely-divided asbestos and alumina, as kaolin, in suspension, substantially as set forth.

2. A filtering medium comprising a support for the filtering material consisting of a core-plate provided in its opposite faces with channels oblique to and inclining toward the major axis of the plate, with channels extending along the longer edges and along one of the end edges of the plate, and with a central open-ended gas-passage parallel with the major axis of the plate, perforated cover-plates applied to opposite sides of the core-plate and an outlet-branch in communication with the aforesaid channels and gas-passage, in combination with a sheath of filtering material, substantially as and for the purpose set forth.

3. A filtering medium of a double-convex-lens shape in cross-section, comprising a support for the filtering material consisting of a sheet-metal core-plate provided with an open-ended central gas-passage parallel with the major axis of the plate, with channels for liquid of variable length parallel with and on opposite sides of said gas-passage, with channels for liquid oblique to and inclining toward the last-named channels and with channels for gas extending along the side edges and one of the ends of the core-plate, perforated cover-plates applied to opposite sides of the core-plate, and an outlet for liquid and gas in communication with the aforesaid gas-passage and channels for liquid and gas, in combination with a sheath of filtering material, substantially as and for the purpose set forth.

4. In a filter, an inclosing casing, a plurality of filtering media arranged therein, and supporting-plates at the head and foot of said media; of brushes in contact with the outer surfaces of the filtering media, mechanism for imparting to said brushes a to-and-fro movement along the media between the head and foot plates, and a stop mechanism operating automatically to limit the reciprocating motion of the brushes, for the purpose set forth.

5. In a filter, an inclosing casing, a plurality of filtering media arranged therein and supporting-plates at the head and foot of said media; of brushes in contact with the outer surfaces of the filtering media, mechanism for imparting to said brushes a to-and-fro movement along the media between the head and foot plates, and a stop mechanism located outside of the filter-casing operating automatically to limit the reciprocating motion of the brushes, for the purpose set forth.

6. In a filter, the combination with the inclosing casing and a series of filtering media arranged therein; of brushes in contact with the outer surfaces of said media, a brush-carrier, a power-driven driving-gear located outside of the filter-casing, an element driven by said gear connected with the brush-carrier to move the same along the filtering media, and a stop mechanism also located outside of the casing, operating to limit the movements of the brush-carrier in either direction, for the purpose set forth.

7. A filter comprising an inclosing casing, a plurality of interspaced filtering media arranged therein, independent brushes, one between each two filtering media operating upon the proximate surfaces thereof, brushes operating upon the outer surfaces of the end filtering media, a support common to all said brushes, and a rack-bar connected with said support; in combination with a driving-pinion in gear with the rack-bar and adapted to be revolved in opposite directions, and means for automatically limiting the reciprocating movements of said rack-bar, for the purpose set forth.

8. In a filter, the combination with the inclosing casing and more or less flexible filtering media each provided at its upper end with a vertically-adjustable tension device exterior of the filtering media; of a bridge or head-plate, supporting-stems at the upper end of said filtering media held in said head-plate, and a support for the lower end of such media, substantially as described.

9. In a filter, the combination with a casing, a hollow filtering medium therein, and a cleansing device as a brush or brushes in contact with the surfaces of said filtering medium, and means for imparting a to-and-fro motion to the cleansing device, comprising a rack-bar and a driving-pinion; of means for limiting the extent of reciprocation of the rack-bar, consisting of spring-actuated pawls or dogs $g'$ pivoted to the rack-bar in pairs distant from each other, the nose of said pawls projecting into the path of the teeth of said driving-pinion, and abutments on said rack-bar for the tail of said pawls adapted to lock the same against rotation in one direction, substantially as and for the purpose set forth.

10. In a filter, the combination with the inclosing casing provided with stuffing-boxes $f^6$ $f^6$ and tubular guides $f^7$ at its upper and lower ends, the lower guides having stop-cocks $f^8$ and a series of interspaced filtering media arranged within said casing, of brushes operating upon the surfaces of the said filtering media, a support common to all the brushes, a to-and-fro-movable cross-head outside of the casing and connecting-rods connected with the brush-supports and guided in the aforesaid stuffing-boxes and tubular guides, for the purpose set forth.

11. In a filter, the combination with the inclosing casing provided with stuffing-boxes $f^6$ $f^6$ and the tubular guides $f^7 f^7$, hollow filtering media arranged in said casing, and cleansing devices comprising a system of interconnected brushes in contact with the surfaces of the filtering media; of means for imparting a to-and-fro motion to the brush system, consisting of a cross-head, connecting-rods $f^5 f^5$ connecting the brush system with such cross-head, said rods guided in the aforesaid tubular guides $f^7 f^7$, a rack-bar secured to said cross-head, a driving-pinion in gear with the rack-bar, and appliances adapted to automatically limit the movement of the rack-bar in either direction, for the purpose set forth.

12. In a filter, the combination with hollow filtering media, of brushes adapted to move to and fro along the surfaces of said media, said brushes consisting of zigzag-shaped brush-rods F provided with an eye at each end, brush-tufts $f$ secured in the recesses or depressions of their rods, and connecting-rods on which said brush-rods are threaded, substantially as and for the purpose set forth.

In testimony whereof I affix my signature in presence of two witnesses.

FRIEDRICH BREYER.

Witnesses:
 DION B. MASON,
 JOPF LEHETNOR.